US006578432B2

(12) United States Patent
Blakesley et al.

(10) Patent No.: US 6,578,432 B2
(45) Date of Patent: Jun. 17, 2003

(54) SEAT BELT TENSION SENSOR

(75) Inventors: Patrick B. Blakesley, Goshen, IN (US);
Robert R. Rainey, Elkhart, IN (US);
Murray Kaijala, Elkhart, IN (US);
John T. Lewis, Granger, IN (US);
Randall Broome, Goshen, IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/923,151

(22) Filed: Aug. 6, 2001

(65) Prior Publication Data

US 2002/0189365 A1 Dec. 19, 2002

Related U.S. Application Data

(63) Continuation of application No. 09/884,615, filed on Jun. 19, 2001.

(51) Int. Cl.$^7$ ................................................. G01N 3/08
(52) U.S. Cl. ........................................................ 73/826
(58) Field of Search ............... 73/826, 828; 324/207.26; 280/735, 801.1, 807; 340/667; 180/273, 268

(56) References Cited

U.S. PATENT DOCUMENTS

| | | | | |
|---|---|---|---|---|
| 5,026,093 A | * | 6/1991 | Nishikaji | 280/807 |
| 5,044,459 A | * | 9/1991 | Nishikaji | 180/268 |
| 5,181,739 A | | 1/1993 | Bauer | 280/807 |
| 5,244,231 A | | 9/1993 | Bauer | 280/807 |
| 5,765,774 A | | 6/1998 | Maekawa | 242/390.9 |
| 5,965,827 A | | 10/1999 | Stanley | 73/862.391 |
| 5,996,421 A | | 12/1999 | Husby | 73/862.451 |
| 6,081,759 A | | 6/2000 | Husby | |
| 6,151,540 A | | 11/2000 | Anishetty | 701/45 |
| 6,161,439 A | | 12/2000 | Stanley | 73/862.391 |
| 6,205,868 B1 | | 3/2001 | Miller | 73/862.391 |
| 6,209,915 B1 | | 4/2001 | Blakesley | 280/801.1 |
| 6,264,236 B1 | | 7/2001 | Aoki | 280/735 |
| 6,336,371 B1 | | 1/2002 | O'Boyle | 73/865.9 |
| 6,356,200 B1 | * | 3/2002 | Hamada et al. | 340/667 |
| 6,363,793 B2 | * | 4/2002 | OBoyle | 73/828 |
| 6,364,352 B1 | * | 4/2002 | Norton | 280/735 |
| 6,400,145 B1 | * | 6/2002 | Chamings et al. | 324/207.26 |
| 2001/0054323 A1 | | 12/2001 | Faigle | |

FOREIGN PATENT DOCUMENTS

WO    WO99/12012    3/1999

* cited by examiner

*Primary Examiner*—Harshad Patel
(74) *Attorney, Agent, or Firm*—Mark P. Bourgeois; Mark W. Borgman; Steven D. Weseman

(57) ABSTRACT

A seat belt tension sensor is attached to a seat belt in a vehicle. The seat belt tension sensor includes a housing attached between the vehicle and the seat belt. A limit structure is located in the housing. A sensor is attached to the limit structure for generating an electrical signal in response to the sensor being placed in tension. The electrical signal changes as a function of tension on the seat belt. The limit structure moves between a first position in which the limit structure transfers the seat belt tension to the sensor and a second position in which the limit structure transfers the seat belt tension to the housing.

27 Claims, 13 Drawing Sheets

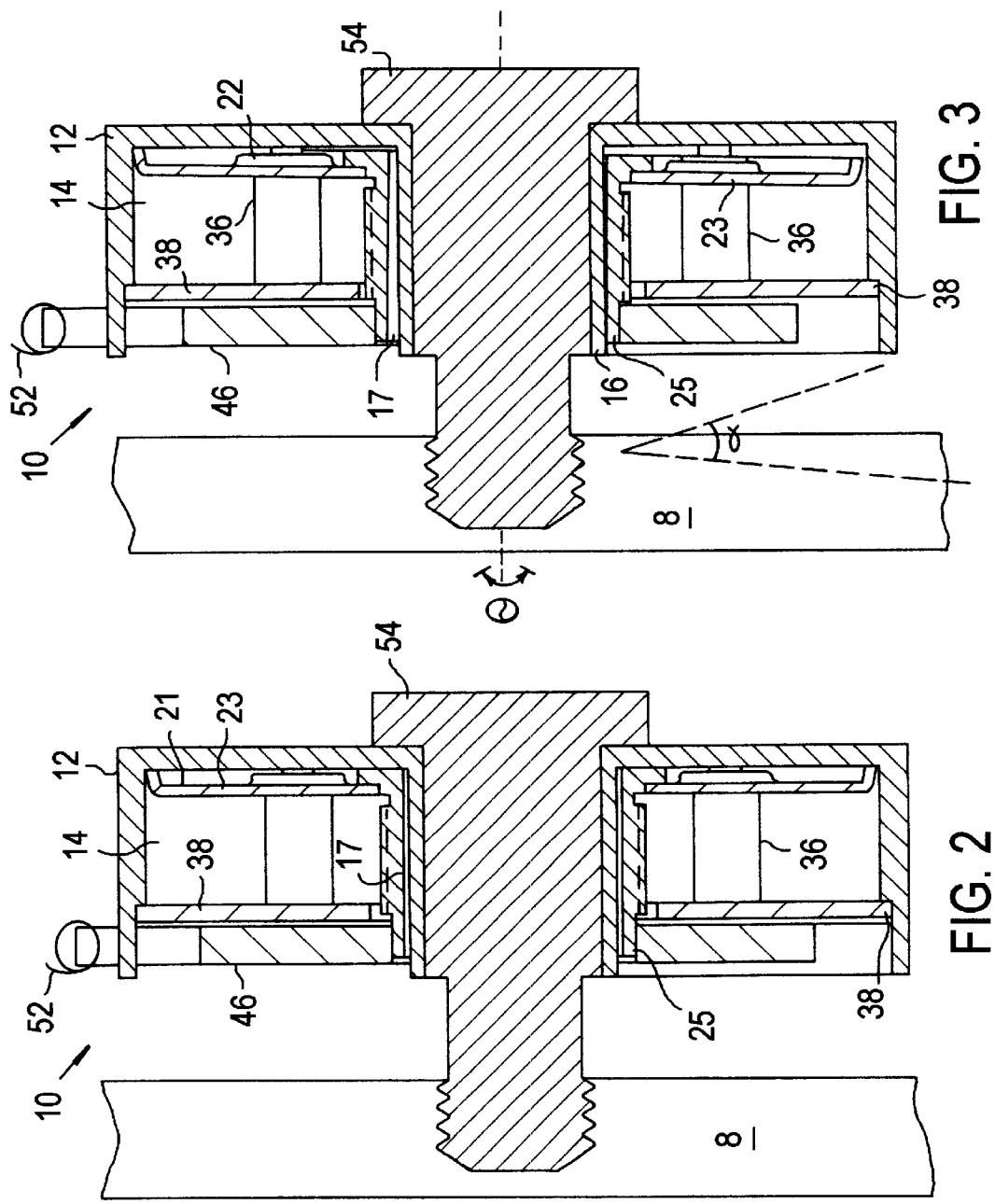

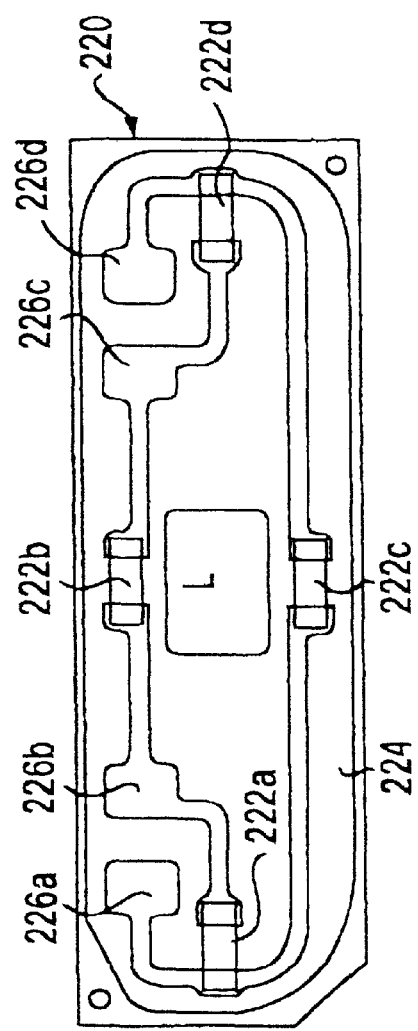
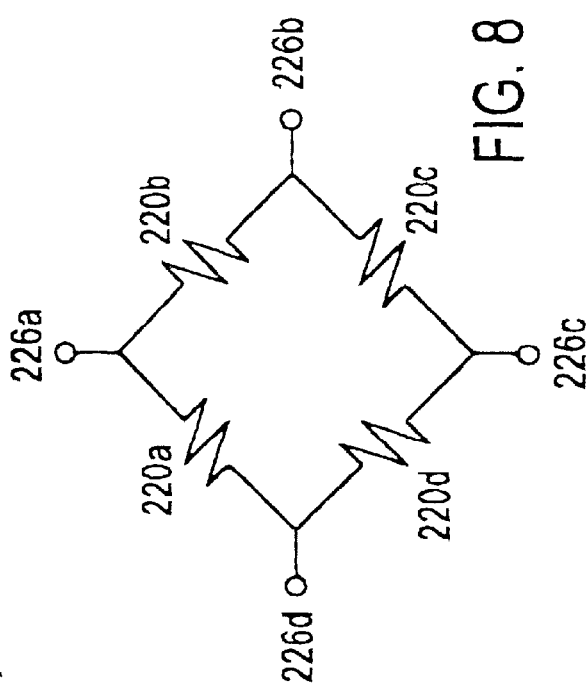
FIG. 7
FIG. 8

SEAT BELT TENSION SENSOR

CROSS REFERENCE TO RELATED AND CO-PENDING APPLICATIONS

This application is a continuation in part of U.S. patent application Ser. No. 09/884,615 filed Jun. 19, 2001 and titled, "Seat Belt Tension Sensor Having Overload Protection".

This application is related to the following U.S. patent applications:

U.S. patent application Ser. No. 09/441,350, filed Nov. 15, 1999 and titled, "Automobile Seat Having Seat Supporting Brackets with a Stepped Weight Sensor".

U.S. patent application Ser. No. 09/374,874, filed Aug. 16, 1999 and titled, "Automobile Seat Weight Sensor".

U.S. patent application Ser. No. 09/374,870, filed Aug. 16, 1999 and titled, "Vehicle Occupant Position Detector and Airbag Control System".

U.S. patent application Ser. No. 09/422,382, filed Oct. 21, 1999 and titled, "Vehicle Seat Weight Sensor".

U.S. Pat. No. 6,209,915, issued Apr. 3, 2001 and titled, "Seat Belt Tension Sensor".

The foregoing patents have the same assignee as the instant application and are herein incorporated by reference in their entirety for related and supportive teachings.

BACKGROUND OF THE INVENTION

1. Field of the Invention

This invention relates to an automobile sensor for detecting the magnitude of a tensile force in a seat belt used in a car seat, and in particular to a sensor that can detect the magnitude of tension in a seat belt and provide an electrical signal that is representative of the magnitude of tensile force.

2. Description of the Related Art

Air bags have been heralded for their ability to reduce injuries and save lives. However, since their incorporation into automobiles, a problem has existed with people of smaller size and small children. Air bags are designed to cushion the impact of occupants and thus reduce the injuries suffered. However, the force needed to properly cushion the occupant varies based on the size and position of the person.

For example, a larger person requires the bag to inflate faster and thus with more force. A smaller person may be injured by a bag inflating at this higher inflation force. A smaller person is more likely to be sitting close to the dashboard and would therefore stand a higher chance of being injured by the impact of the inflating bag, as opposed to the passenger hitting the fully inflated bag to absorb the impact of the accident. An average-sized person can also be injured by an airbag inflation if they are leaning forward, as for example, if they are adjusting the radio.

Because of the concern over injury to passengers in these situations, the National Highway Transportation Safety Administration (or NHTSA), an administrative agency of the United States, is instituting rules requiring the air bag deployment system to identify the passenger size and position and inflate the air bag accordingly.

One way to accomplish this task is to use a seat belt tension sensor in conjunction with an occupant weight sensor. The weight sensor can provide an indication of the force placed by an occupant on the seat. However, if the seat belt is unduly tightened, it can place an additional downward force on the passenger, creating an erroneous weight reading. Similarly, it is common for infant car seats to be secured tightly to the seat. In this circumstance, it is critical for the system to recognize that the passenger does not warrant inflation of the air bag. By sensing the tension on the seat belt in addition to the weight reading from the seat, the actual weight of the occupant can be determined. This allows for the system to safely deploy the air bag.

SUMMARY OF THE INVENTION

It is a feature of the present invention to provide a seat belt tension sensor for attachment to a seat belt in a vehicle. The seat belt tension sensor includes a housing attached between the vehicle and the seat belt. A limit structure is located in the housing. A sensor is attached to the limit structure for generating an electrical signal in response to the sensor being placed in tension. The electrical signal changes as a function of tension on the seat belt. The limit structure moves between a first position in which the limit structure transfers the seat belt tension to the sensor and a second position in which the limit structure transfers the seat belt tension to the housing.

BRIEF DESCRIPTION OF THE DRAWINGS

FIG. 2 is a cross-sectional view of FIG. 1 in an assembled state.

FIG. 3 is another cross-sectional view of FIG. 1 in an assembled state.

FIG. 7 is a side view of the strain member.

FIG. 8 is a schematic diagram of the wheatstone bridge circuit.

It is noted that the drawings of the invention are not to scale.

DETAILED DESCRIPTION OF THE PREFERRED EMBODIMENTS

Figure 1:
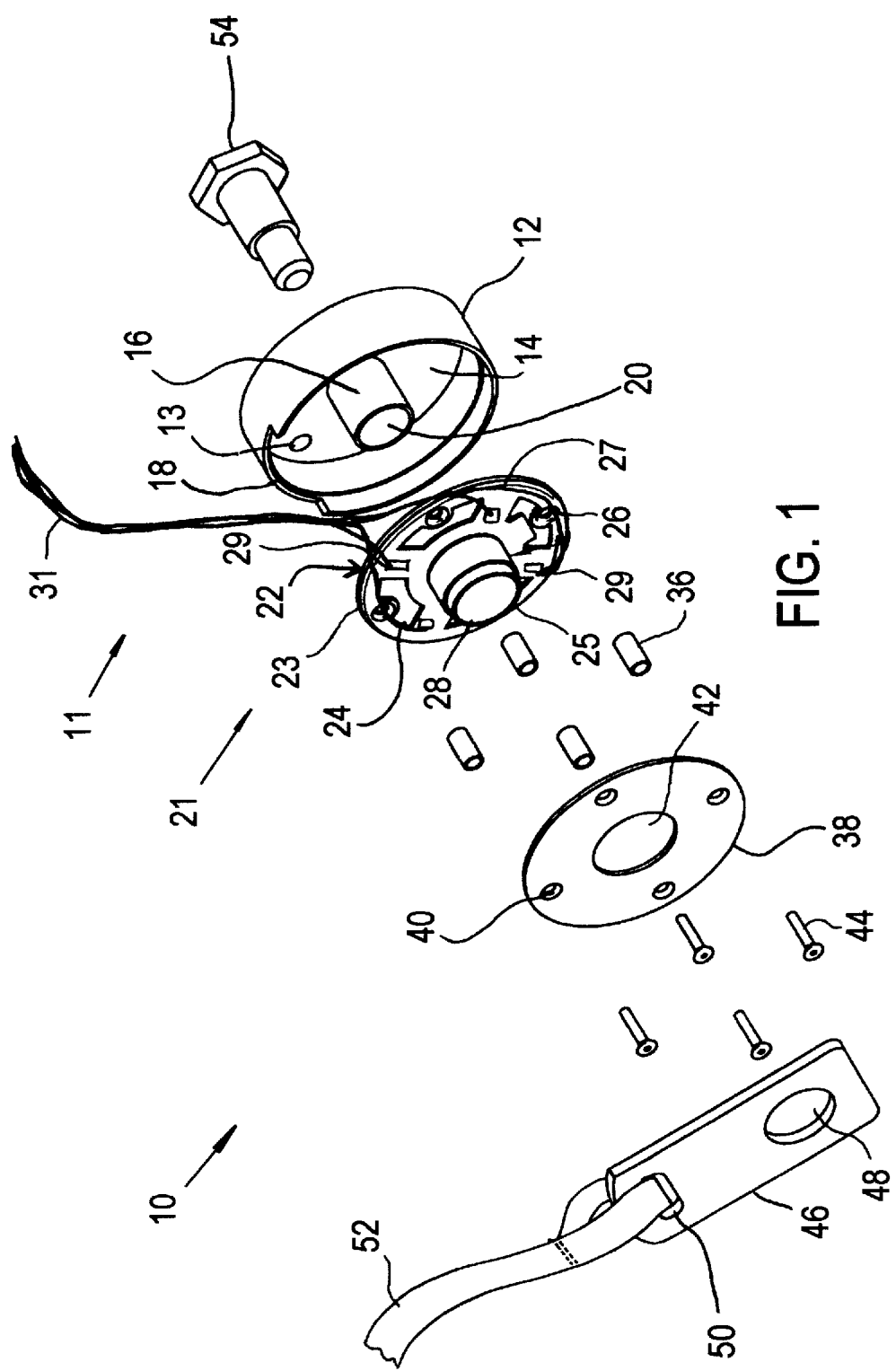
FIG. 1 is a perspective exploded view of the preferred embodiment of a seat belt tension sensor.

The present invention is a seat belt tension sensor. Referring to FIGS. 1, 2 and 3 there is a seat belt tension sensor assembly 10 shown. Assembly 10 has a limit structure 11 and a sensor 21. Limit structure 11 is fastened between seat belt components. For example, structure 11 can be attached to an anchor plate 46 that is attached to a seat belt webbing 52 and to a vehicle seat or floor 8 (FIG. 2) by fastener or bolt 54.

Limit structure 11 has a housing 12 with a cavity 14. A cylindrical flange 16 extends into cavity 14 and includes a hollow center portion 20. A recess 18 is provided on one side of housing 12 to allow anchor plate 46 to extend beyond housing 12. A circular hub 22 has a flat disc shaped portion 23, and a cylindrical rim 25 attached to and extending from the disc shaped portion 23. The rim 25 has an aperture 28 passing therethrough. Several slots 24 are located on disc 23. Several screw holes 26 are also located in disc 23. Disc 23 has several arms 27 that each have a strain gage resistor 29 mounted thereon. Hub 22 goes over flange 16 and creates a gap 17 between the rim and flange as shown in FIG. 2.

A cover 38 goes over housing 12 and is retained to housing 12 by screws 44 or other fasteners that pass through screw holes 26 and into threaded bores 13 in housing 12. Cover 38 has screw holes 40 and a central opening 42. Several springs 36 are located between cover 38 and disc portion 23. Anchor plate 46 has a mounting hole 48 that goes over rim 25. Plate 46 has a slot 50 that the seat belt webbing 52 passes through. Webbing 52 would typically be looped through slot 50 and then sewed onto itself to securely fasten the webbing to the plate.

After assembly, threaded fastener or bolt 54 extends through hollow center portion 20, rim aperture 28, central opening 42 and mounting hole 48 and mates with threads in a vehicle floor or seat 8. Fastener 54 is a conventional fastener such as a hex headed bolt, Allen head screw, shoulder screw or rivet.

Sensor 21 includes the hub 22, disc portion 23 and rim 25. Hub 22 is preferably formed from 430 stainless steel. Several strain gage resistors 29 are arranged on arms 27 around rim 25. Details of the construction and operation of resistors 29 are shown in U.S. patent application Ser. No. 09/441,350, filed Nov. 15, 1999 and titled, "Automobile Seat Having Seat Supporting Brackets with a Stepped Weight Sensor".

Resistors 29 would typically be connected in a conventional wheatstone bridge configuration. Resistors 29 are strain sensitive and will change resistance based on the amount of strain in arms 27. A wiring harness 31 would typically connect resistors 29 to an external electrical circuit.

Referring to FIG. 2, showing a normal load state for the present invention, when an occupant sits in a vehicle seat and buckles a seat belt, the tension placed in the seat belt is transferred from webbing 52 to buckle plate 46 to sensor 21 through rim 25 and disc 23. The force is transferred from disc 23 through springs 36 to cover 38 and housing 12 then to floor 8 through fastener 54. In this state, two of springs 36 are being compressed pressing down on disc 23 while two of springs 36 are in tension. An electrical output signal is generated by the resistors 29 that is proportional to the magnitude of the tension in the seat belt and is transmitted over a wire harness 31 to a conventional air bag controller (not shown). The air bag controller can then use the seat belt tension information to compute a more accurate profile of the seat occupant and use that information to control deployment of the airbag. This is the normal operational state of the seat belt tension sensor in which all of the seat belt tension is carried through the sensor 21.

In a situation where the vehicle is involved in a crash, the seat belt tension sensor operates in a different mode called a high load or crash state as shown in FIG. 3. In the high load state, the limit structure carries the tension placed on the seat belt. The amount of tension in the seat belt in a crash situation is much larger than in normal operation. If the hub 22 was designed to carry all of this tension, it would not flex enough to properly function as a strain gage sensor. Therefore, in a crash situation, the limit structure carries the tension through the much stronger limit structure 11. As the tension in the seat belt increases, the hub 22 rotates or tilts until rim 25 contacts flange 16 providing a positive stop. The seat belt tension is then transferred through buckle plate 46 to rim 25, flange 16, bolt 54 and then to the vehicle floor or seat frame 8. The limit structure 11 is designed so as not to deform under the load placed on it by the seat occupant during a crash situation.

Remarks About the Preferred Embodiment

The seat belt tension sensor has several advantages. It allows accurate sensing of seat belt tension, while at the same time providing the structural strength needed for occupant restraint in a crash situation. The seat belt tension sensor allows an airbag controller to make better decisions as to when and how to deploy and airbag based upon more accurate seat occupant information. In the case of a child's car seat being strapped into a car seat, the seat belt tension sensor in conjunction with a seat weight sensor allows the airbag controller to properly compute that the seat occupant has a low weight and to prevent deployment of the airbag.

The gap between the hub and the housing flange is the travel range of the sensor as it is actuated. This design solves four main problems. 1) Maintaining sensitivity at low loads without damage at higher loads. 2) Maintaining restraint system integrity. 3) Integration into multiple restraint systems. 4) Reading correctly over a wide range of strain angles. A theta angle represents rotation about the axis of the bolt. An alpha angle represents tilt toward and away from the seat.

1) Maintaining Sensitivity at Low Loads without Damage at Higher Loads.

When the gap between the rim and the flange is closed the load applied to the strain sensor elements reaches its limit. After this, the load is transferred to the bolt. Limiting the maximum load applied to the strain sensor is necessary since the working range of the sensor is generally below 100-lbs. but the sensor must withstand large (often greater than 1000-lb.) loads without damage and must not compromise the integrity of the passenger restraint system.

Springs 36 can be omitted if desired. Springs 36 are added to allow larger motions. These springs apply a load, which holds the hub 22 in place until a designed actuation force is reached. Once this force is exceeded the springs allow the hub to move. This both limits the load applied and allows the tolerances between the limit structure 11 and the shoulder bolt 54 to be looser.

2) Maintaining Restraint System Integrity.

The present design allows the use of the same or very similar mounting bolts and anchors and mounting technique as do current seatbelt attachment methods. Thus, safety engineers are very familiar with the requirements of the attachment method and installation procedures are changed as little as possible.

3) Integration into Multiple Restraint Systems.

This present invention allows the sensor to be attached at the most common point of a wide variety of belt systems. It is useable even with very short bolt to buckle distances. The only changes required in some installations are a larger mounting hole in the anchor and a longer bolt to allow for the thickness of the device. The shoulder bolt is used as the stop. A tube through which the bolt passes could also be used as a stop. The advantage of this design is that it does not require a shoulder bolt with the correct shoulder length and diameter for the device to operate. A standard bolt may be used. This improves field serviceability.

4) Reading Correctly Over a Wide Range of Theta and Alpha Angles.

Theta represents rotation about the axis of the bolt. Alpha represents tilt toward and away from the seat. The attachment to the floor may be fixed or, more likely, the sensor would be free to rotate and tilt plus or minus several degrees. This freedom of movement allows the sensor to respond only to tension on the seatbelt while accommodating user needs. The cross-style sensor design allows the tension load to be applied at a fairly wide range of theta angles with only small changes in sensitivity. This allows the sensor to rotate (theta) normally to accommodate passenger needs. If desired, the sensor can rotate around the bolt axis in order that its sensing elements could remain aligned with the direction of the pull throughout the normal rotation limit of the anchor. This could allow the use of simplified sensor element designs.

The sensor 21 may also be shaped such that only tension is sensed and compression is ignored. This is accomplished by removing one or more arms 27 on the "top" side of the sensor. In the event that the angle of tension application is desired, the sensor can be constructed so that the alpha angle is reported as if it were tension. Or, another separate strain gage or potentiometric sensors or the like can be used to report the angle(s) (alpha and/or theta) at which the tension load is applied.

First Alternative Embodiment

Figure 4:
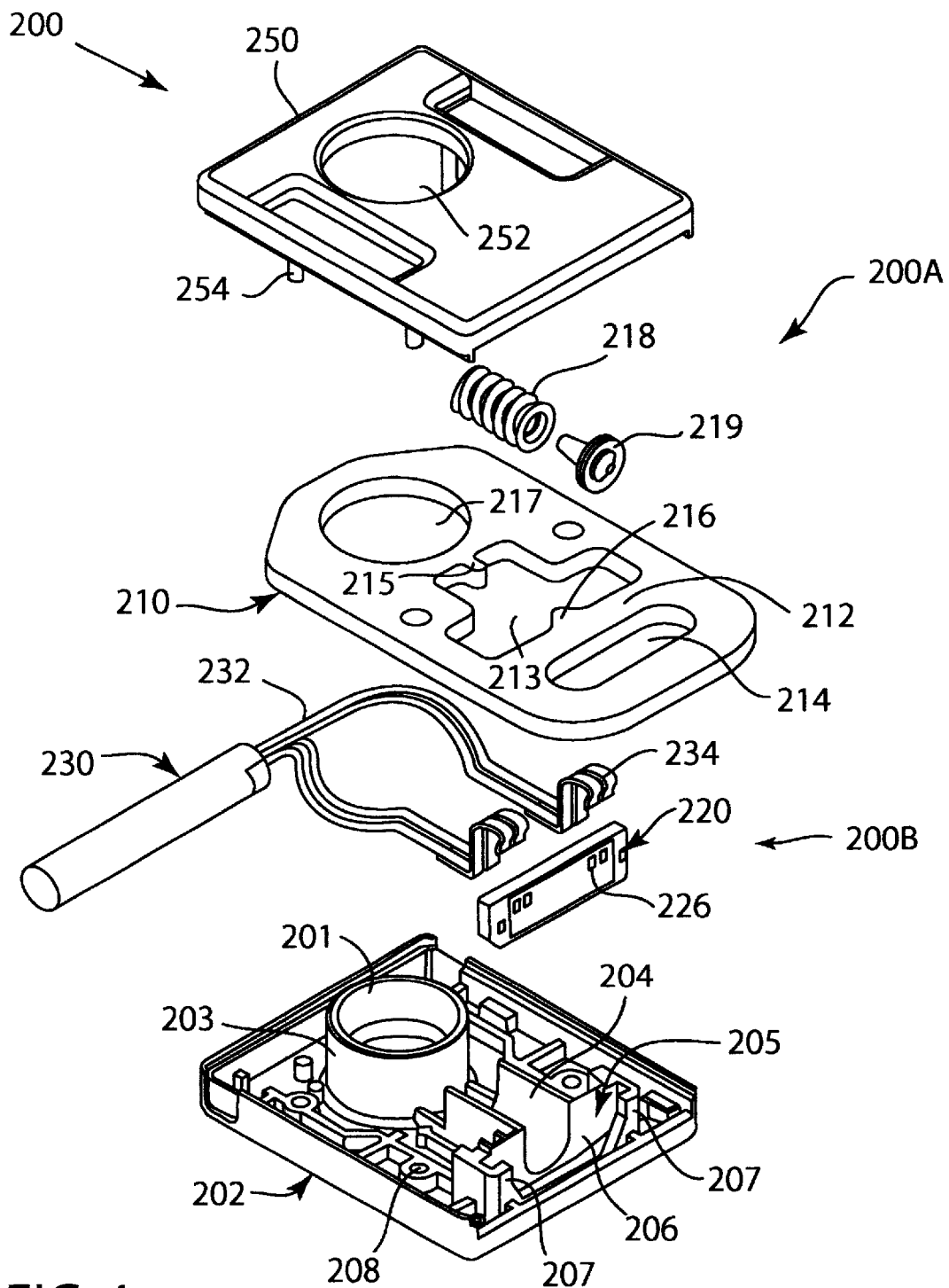
FIG. 4 is a perspective exploded view of an alternative embodiment of a seat belt tension sensor.
Figure 5:
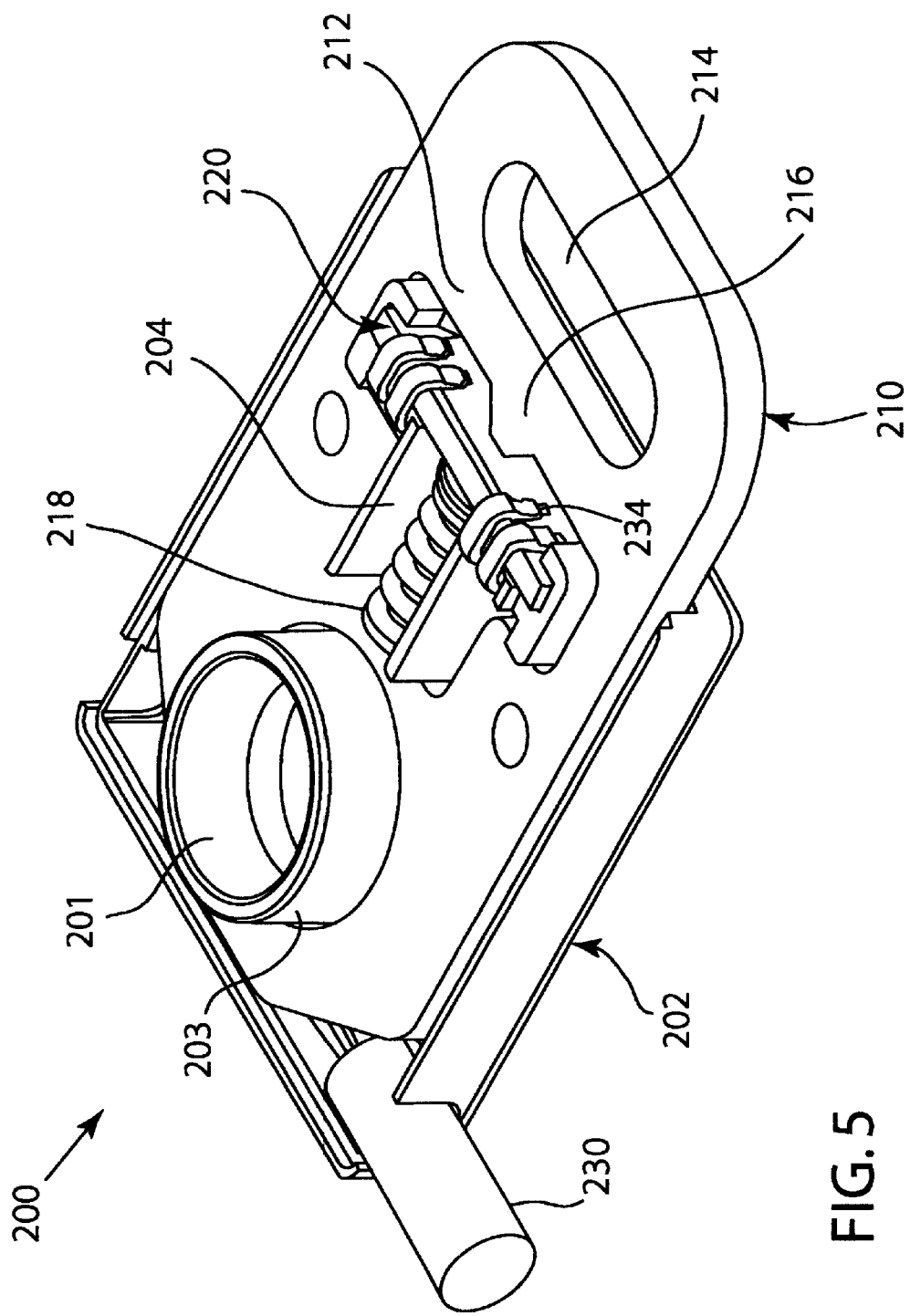
FIG. 5 is a perspective assembled view of FIG. 4 without the cover.
Figure 6:
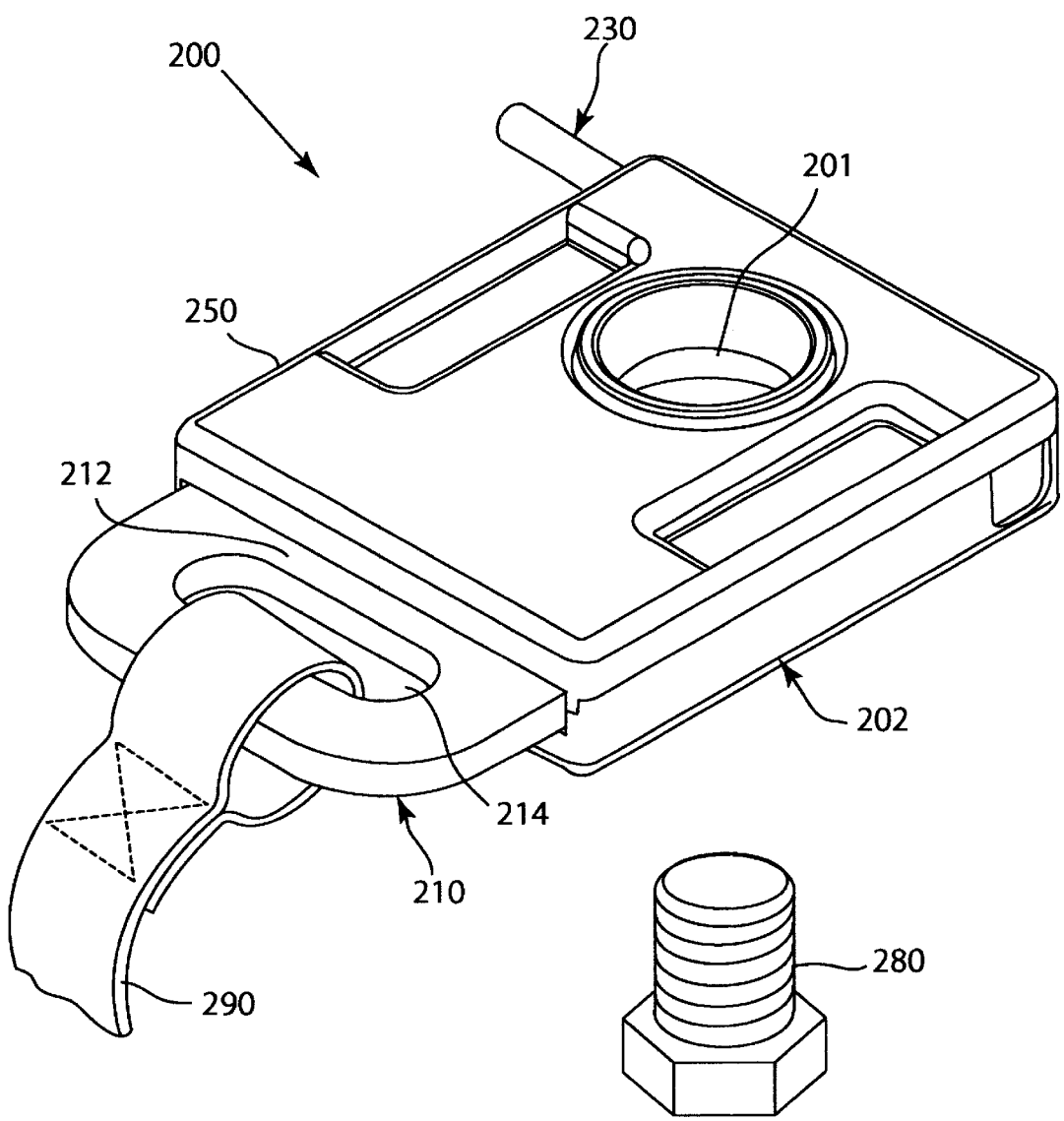
FIG. 6 is a perspective assembled view of FIG. 4 with the cover.
Figure 10:
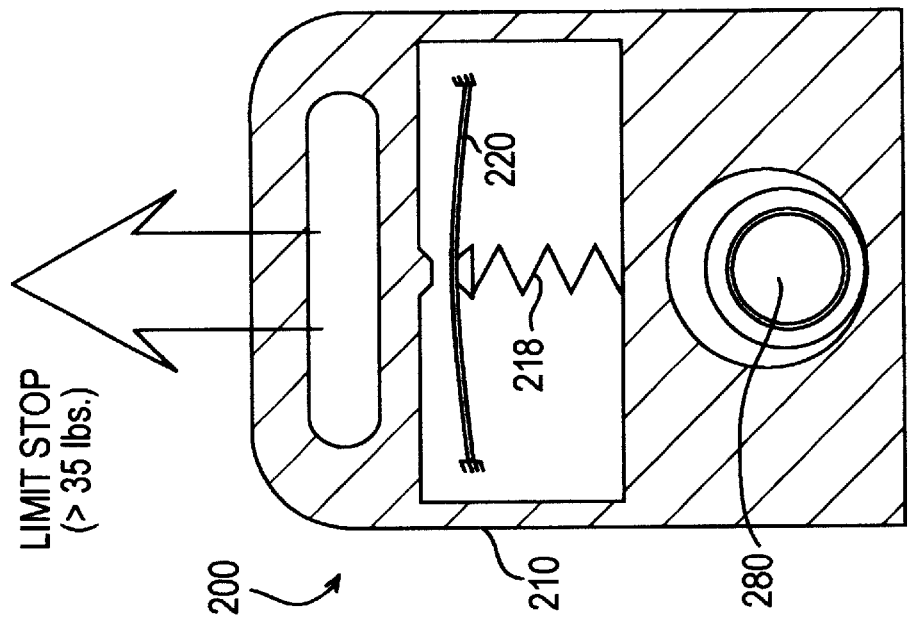
FIG. 10 is a side view of the seat belt tension sensor of FIG. 5 showing a fully loaded state.
Figure 9:
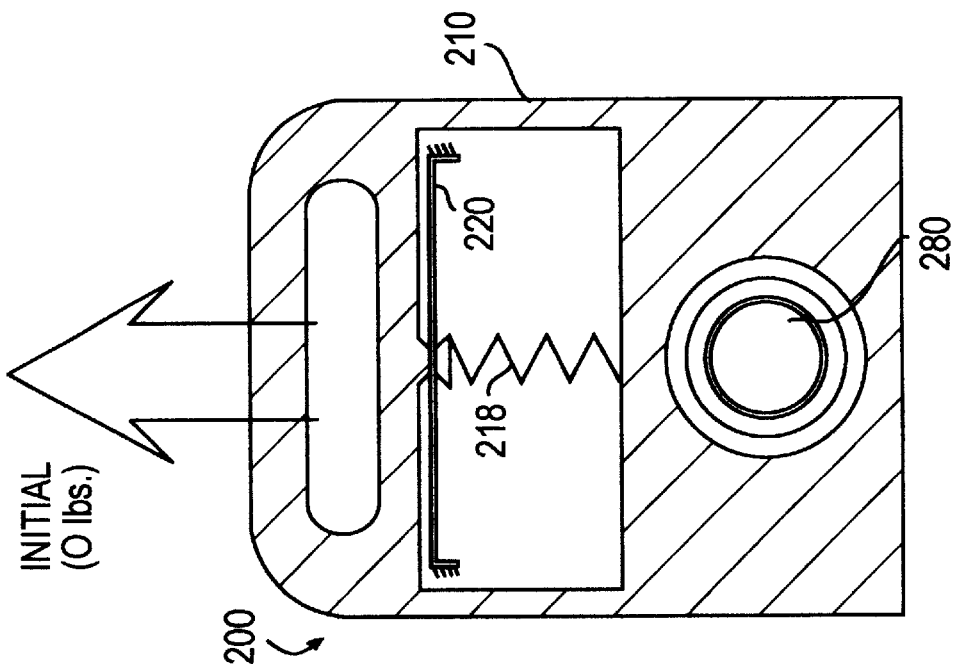
FIG. 9 is a side view of the seat belt tension sensor of FIG. 5 showing an unloaded state.

Referring to FIGS. 4–6 there is an alternative embodiment of a seat belt tension sensor assembly 200 shown. Assembly 200 comprises a limit structure 200A and a sensor 200B. Limit structure 200A includes a housing 202, an anchor plate 210, a cover 250, and a strain sensor or member 220. Housing 202 has an aperture 201, flange 203, spring channel 204, walls 206 and 207 that define a strain member slot 205 and holes 208. Anchor plate 210 is loosely fitted within housing 202. Anchor plate 210 includes an arm 212 extending between a first cutout 213 and a second cutout 214. Seat belt webbing 290 is attached through cutout 214. A pair of projections 215 and 216 extend into first cutout 213. A mounting hole 217 is provided in anchor plate 210. A spring 218 is mounted in channel 204. One end of spring 218 is mounted over projection 215. Sensor 200B has a strain member 220 that is mounted in slot 205. A plastic support 219 fits into spring 218. Support 219 rests adjacent a surface of strain member 220 and serves to even out the forces from spring 218 on strain member 220.

A wire harness 230 has several wires 232 that end in terminals 234. Terminals 234 clip over connector pads 226 on member 220. A cover 250 has a hole 252 and projections 254. Projections 254 mate with holes 208 to snap fit cover 250 to housing 202. Seat belt tension sensor 200 is attached to a vehicle floor (not shown) by a fastener 280 such as a bolt. Fastener 280 goes through holes 201, 217 and 252.

Strain member 220, shown in FIGS. 7 and 8, is formed of a material capable of carrying the tension applied by spring 218 when the seat belt is tightened. Preferably, the strain member 220 is formed of 430 stainless steel. The strain member 220 includes stain sensitive resistors 222a,b,c,d formed thereon. These are formed by first screening a dielectric layer 224 onto the steel. The strain member 220 is then kiln fired at 850° C. Next, electrically conductive traces 225 and connector pads 226a,b,c,d are similarly screened onto the strain member 220. The strain member 220 is again kiln fired at 850° C. The strain sensitive resistors 222a,b,c,d are next screened onto the strain member 220 in positions defined by the electrically conductive traces 225. The strain member 220 is again kiln fired at 850° C. At this point, a final coating of a covercoat or epoxy can be applied to protect the electrical components of strain member 220. This coating is not required, but may be desirable in circumstances where high abrasion or contaminants are expected. It should be noted that the strain sensitive resistors 222a,b,c,d and connector pads 226a,b,c,d together form the Wheatstone bridge circuit of FIG. 8.

Turning to FIGS. 4–5, and 9–10, when a tension is applied to seat belt 290, anchor plate 210 causes spring 218 to apply pressure to the center of the strain member 220. As the tension increases, the strain sensitive resistors 222 will change resistance resulting in an electrical output signal that changes in proportion to the amount of strain in seat belt 290. This electrical signal is provided to an external electrical circuit by wire harness 230.

In a collision situation, the force applied to the seat belt overcomes the spring resistance and anchor plate 210 moves to rest against flange 203. Fastener 280 passes through hole 201 and is adjacent to flange 203. The force from the seat belt is transferred to fastener 280 which is attached to a vehicle floor. Thus, the force is transferred form the seat belt to the vehicle floor. In this way, no further tension is applied to the strain member 220 and the strain member 220 is thus protected from excessive forces by limit structure 220A.

Figure 11:
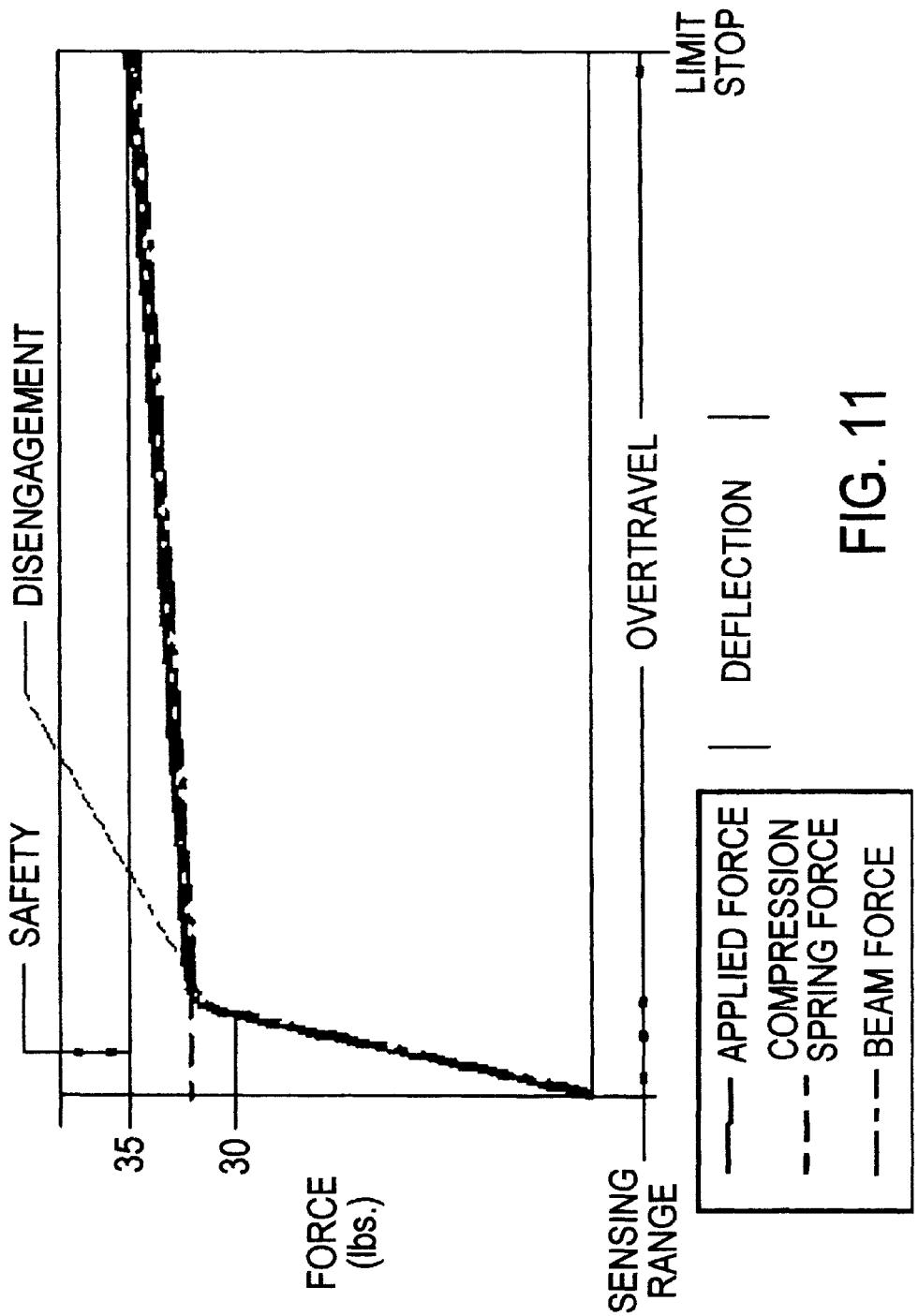
FIG. 11 is a graph of force versus travel for the seat belt tensor sensor of FIG. 5.

A graph showing force versus travel for sensor 200 is provided in FIG. 11. Note that the graph varies linearly up to the point of overtravel at which point it flattens indicating and overtravel condition. The output limit is set for the point at which the fastener 280 engages against the anchor plate 210.

Second Alternative Embodiment

Figure 12:
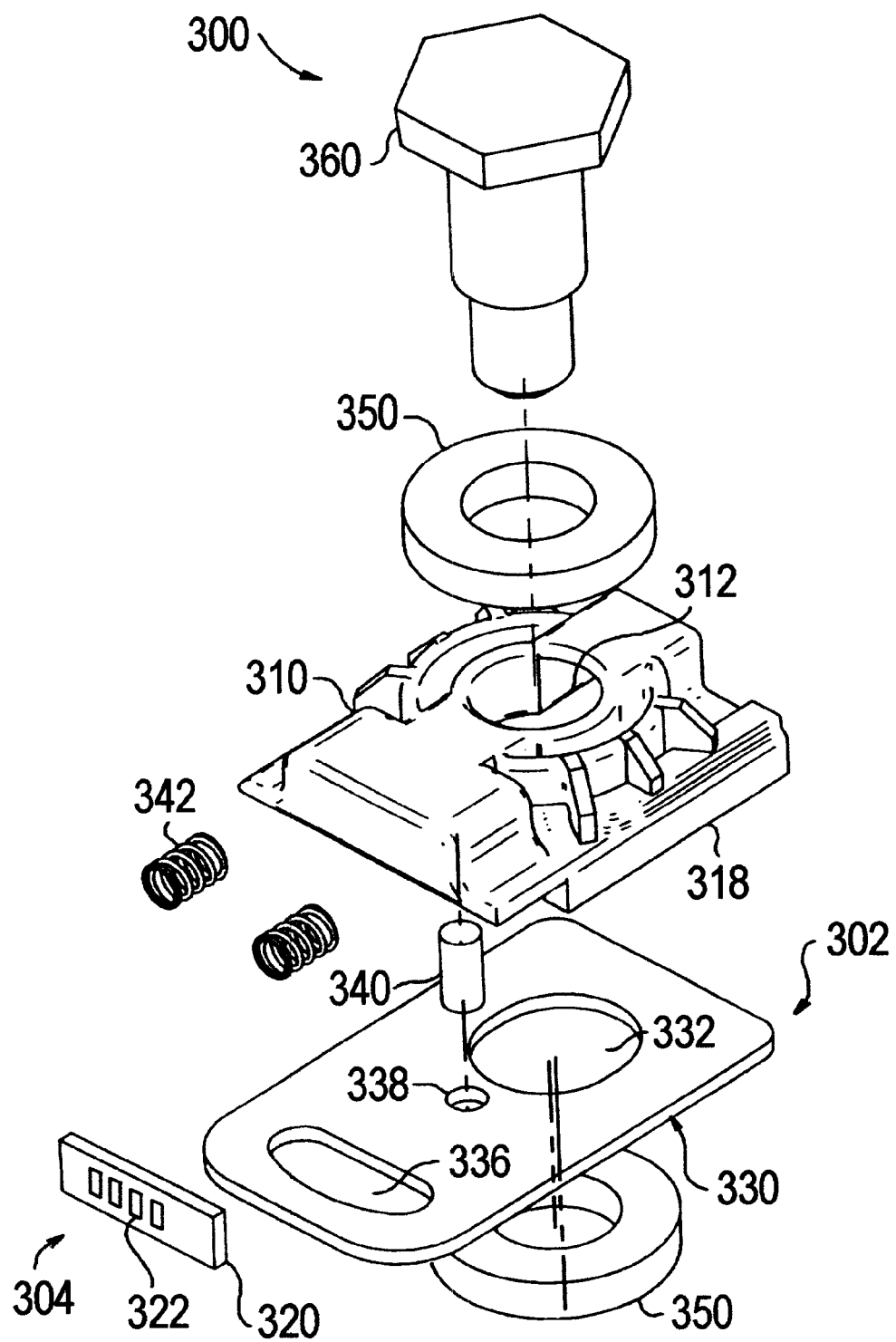
FIG. 12 is an exploded view of an alternative embodiment of a seat belt tension sensor.
Figure 13:
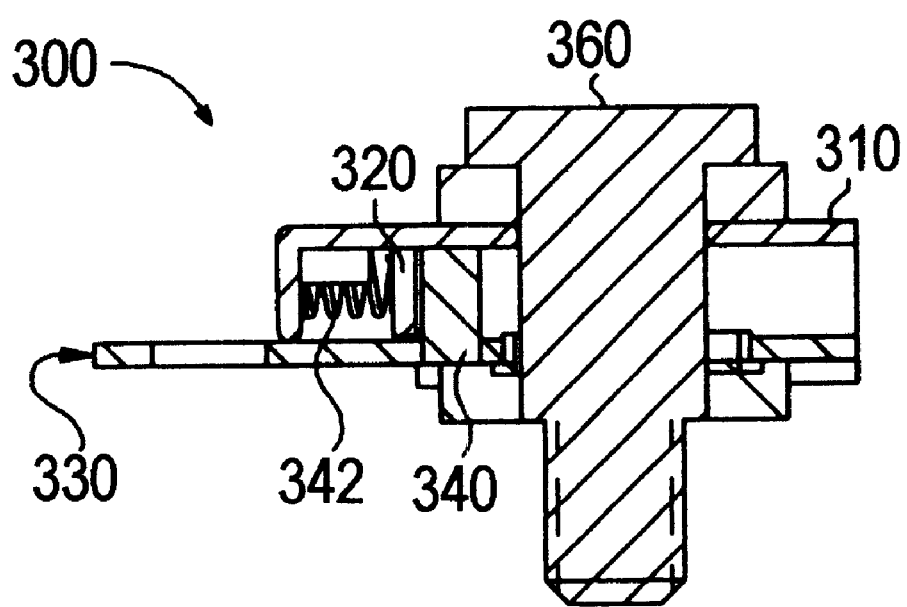
FIG. 13 is a cross-sectional view of the seat belt tension sensor of FIG. 12.
Figure 14:
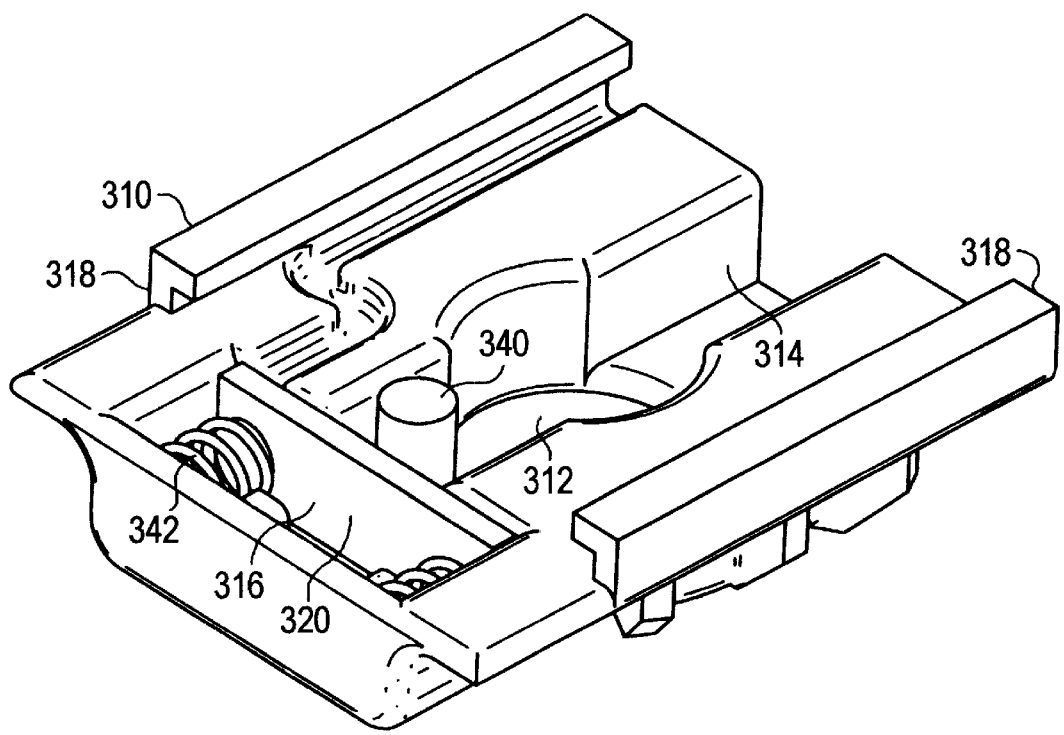
FIG. 14 is a perspective view of the seat belt tension sensor of FIG. 12.

FIGS. 12–14 show another seat belt tension sensor assembly 300. Assembly 300 comprises a limit structure 302 and a sensor 304. Limit structure 302 includes a housing 310, an anchor plate 330, an actuator pin 340 and bolt 360. Housing 310 has an aperture 312, a channel 314, rails 318 and strain member slot 316. Anchor plate 330 is slidably retained within housing 310 by rail 318. Anchor plate 330 includes a cutout 336, a hole 338 and a mounting hole 332. Seat belt webbing would be attached through cutout 336. A pair of springs 342 are mounted in slot 316. Sensor 304 has a strain member 320 with resistors 322 that are mounted in slot 316. Actuator pin 340 rests against the backside of strain member 320. A pair of foam washers 350 are included in the installation of the sensor to reduce vibration noise and allow axial off set loads. The foam washers allow the seat belt tension sensor to flex slightly depending on the direction of pull on the seat belt webbing.

Seat belt tension sensor 300 is attached to a vehicle floor or seat (not shown) by a fastener 360 such as a bolt. Fastener 360 goes through holes 312 and 332.

Strain member 320 is similar to strain member 220, shown in FIGS. 7 and 8. When a tension is applied to the seat belt webbing, anchor plate 330 causes pin 340 to apply pressure to the center of the strain member 320. As the tension increases, the strain sensitive resistors 322 will change resistance resulting in an electrical output signal that changes in proportion to the amount of strain in the seat belt. This electrical signal is provided to an external electrical circuit by a wire harness (not shown).

In a collision situation, the force applied to the seat belt overcomes the spring resistance and anchor plate 330 moves to rest against bolt 360. The force is transferred form the seat belt to the vehicle floor. In this way, no further tension is applied to the strain member 320 and the strain member 320 is thus protected from excessive forces by limit structure 302.

Third Alternative Embodiment

Figure 15:
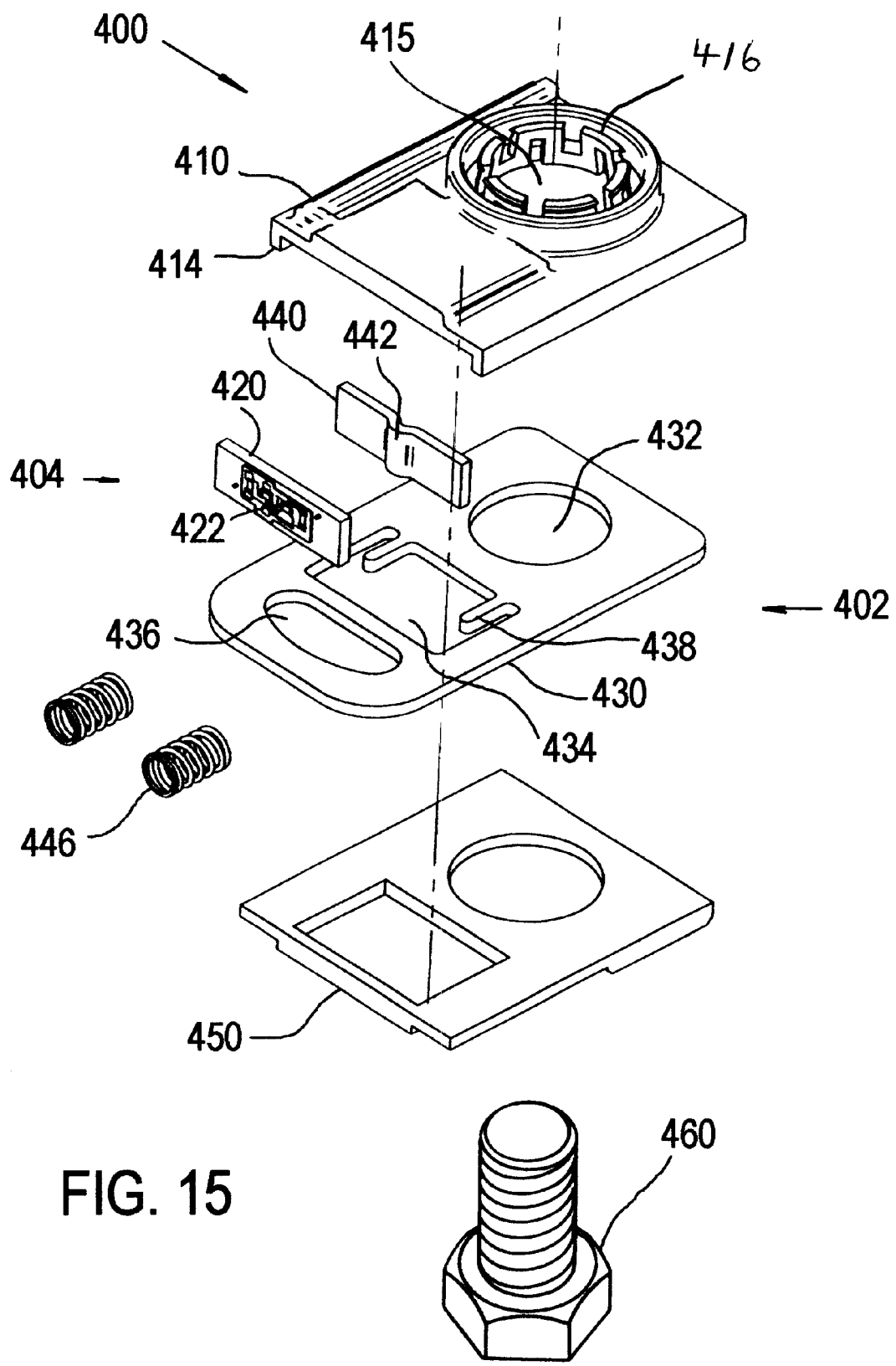
FIG. 15 is an exploded view of an alternative embodiment of a seat belt tension sensor.
Figure 16:
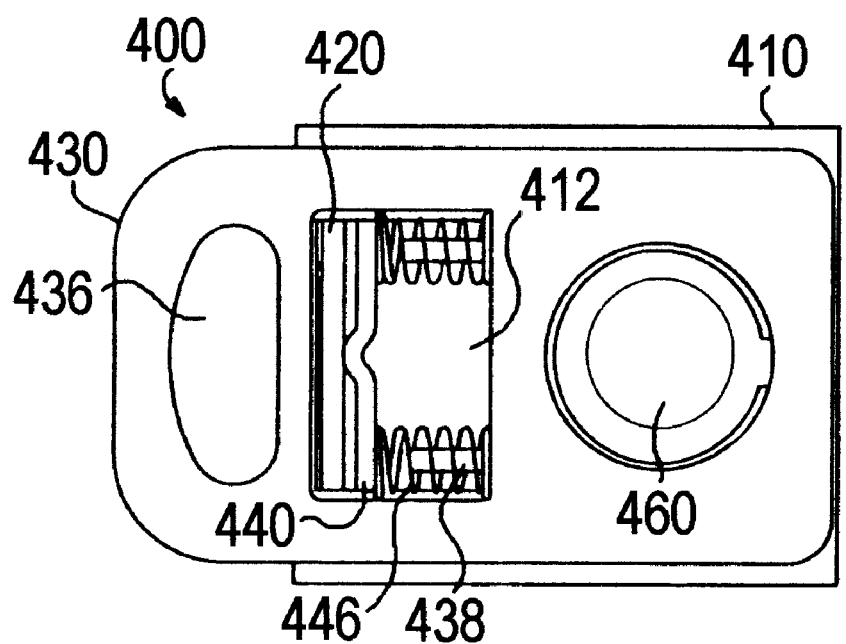
FIG. 16 is a top view of the seat belt tension sensor of FIG. 15.

FIGS. 15–16 show another seat belt tension sensor assembly 400. Assembly 400 comprises a limit structure 402 and a sensor 404. Limit structure 402 includes a housing 410, a anchor plate 430, an actuator bar 440, cover 450 and bolt 460. Housing 410 has an hole 415 and rails 414. Anchor plate 430 is slidably retained within housing 410 by rails 414. Anchor plate 430 includes a first cutout 436, a second cutout 434, a pair of projections 438 and a mounting hole 432. Seat belt webbing would be attached through cutout 436. A pair of springs 446 are mounted in over projections 438. Sensor 404 has a strain member 420 with resistors 422 that are mounted in cutout 434. Actuator 440 has a bump 442 that rests against the backside of strain member 420. Several fingers 416 are attached to housing 410 around hole 415. The fingers grip around fastener 460 and allow axial off set loads. The fingers 416 allow the seat belt tension sensor to flex slightly depending on the direction of pull on the seat belt webbing.

Seat belt tension sensor 400 is attached to a vehicle floor or seat (not shown) by a fastener 460 such as a bolt. Fastener 460 goes through holes 415 and 432.

Strain member 420 is similar to strain member 220, shown in FIGS. 7 and 8. When a tension is applied to the seat belt webbing, anchor plate 430 compresses spring 446 to apply pressure to actuator 440 that allows bump 442 to apply pressure to the center of the strain member 420. As the tension increases, the strain sensitive resistors 422 will change resistance resulting in an electrical output signal that changes in proportion to the amount of strain in the seat belt. This electrical signal is provided to an external electrical circuit by a wire harness (not shown).

In a collision situation, the force applied to the seat belt overcomes the spring resistance and anchor plate 430 moves to rest against bolt 460. The force is transferred form the seat belt to the vehicle floor. In this way, no further tension is applied to the strain member 420 and the strain member 420 is thus protected from excessive forces by limit structure 402.

Variations of the Preferred Embodiment

The sensor shown was several strain gage resistors, one skilled in the art will realize that the preferred embodiment would work with other types of sensors. For example, discrete chip resistors could be attached or foil type strain gages could be used. Furthermore, the shape of the sensor could be varied to any configuration that would transfer the weight from the seat belt.

Another variation of the seat belt tension sensor would be to utilize other electrical connections other than a wire harness. For example, a connector or terminals could be added.

Yet, a further variation, would be to place signal conditioning circuitry on hub 22 or strain member 200 to amplify and filter the electrical signal before it is transmitted to the airbag controller.

The seat belt tension sensor shown was mounted between a seat belt and a vehicle member. One skilled in the art will realize that the preferred embodiment could be mounted to various locations on the seat or vehicle interior. For example, the seat belt tension sensor could be attached to the vehicle roof.

The illustrated embodiment showed the use of the seat belt tension sensor in an automobile seat. It is contemplated to utilize the seat belt tension sensor in other occupant sensing applications such as chairs, sofas, scales, beds and mattresses, hospital equipment, cribs, airplane seats, train seats, boat seats, amusement rides, and theater seats, While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A seat belt tension sensor for attachment to an anchor plate in a vehicle, the anchor plate having an aperture comprising:
    a) a housing having a cavity and a cylindrical flange extending into the cavity, the flange having a hole therethrough;
    b) a hub for receiving the anchor plate, the hub being located in the cavity and disposed over the flange;
    c) at least one sensor attached to the hub, the sensor generating an electrical signal in response to the sensor being placed in tension, the electrical signal changing as a function of tension on the seat belt; and
    d) a fastener extending through the hole of the flange and the hub for mounting the tension sensor to the vehicle, the hub moveable between a first position in which the hub transfers increasing seat belt tension to the sensor and a second position in which the hub transfers increasing seat belt tension to the housing.

2. The seat belt tension sensor according to claim 1, wherein the hub has a disc portion and a rim, the sensor located on the disc portion.

3. The seat belt tension sensor according to claim 2, further comprising a cover mounted to the housing and a plurality of springs located between the cover and the disc portion, the springs adapted to switch between the first and second positions.

4. The seat belt tension sensor according to claim 1, wherein the sensor is a strain gage resistor.

5. The seat belt tension sensor according to claim 2, wherein a plurality of strain gage resistors are located on the disc portion surrounding the rim.

6. The seat belt tension sensor according to claim 5, wherein the resistors are connected to form a wheatstone bridge.

7. The seat belt tension sensor according to claim 1, wherein the housing has a recess, the anchor plate passing through the recess.

8. A seat belt tension sensor for attachment to an anchor plate having an aperture for receiving a fastener for mounting to the seat belt tension sensor comprising:
    a) a housing having a cavity and a cylindrical flange into the cavity, the flange having a hole therethrough;
    b) a hub for receiving the anchor plate, the hub being located in the cavity and disposed over the flange, and having a disc portion, the disc having an attached rim;
    c) at least one strain gage resistor attached to the disc, the strain gage resistor generating an electrical signal in response to the sensor being placed in tension, the electrical signal changing as a function of tension on the seat belt; and
    d) the housing and the hub being positioned such that the fastener can extend through the hole and the hub for mounting to the vehicle.

9. The seat belt tension sensor according to claim 8, wherein the hub limits the strain on the resistor by engaging the housing in response to seat belt tension.

10. The seat belt tension sensor according to claim 9, further comprising a cover mounted to the housing and a plurality of springs located between the cover and the disc portion.

11. A seat belt tension sensor for measuring the amount of tension in a seat belt assembly in a vehicle, the seat belt assembly having an anchor plate that is attached to the vehicle with a fastener, the anchor plate defining an opening for receiving the fastener, the seat belt tension sensor comprising:
- a) a limit structure located between the anchor plate and the fastener, the limit structure comprising:
  - a1) a housing having a cavity and a cylindrical flange extending into the cavity, the flange having a hole therethrough; and
  - a2) a hub for receiving the anchor plate, the hub being located in the cavity and disposed over the flange, the hole and the hub being aligned for receiving the fastener; and
- b) a sensor mounted to the hub for generating an electrical signal in response to the seat belt being placed in tension, the hub moveable between a first position in which the hub transfers increasing seat belt tension to the sensor and a second position in which the hub transfers increasing seat belt tension to the housing.

12. A seat belt tension sensing device suitable for use with a vehicle connection bolt the device comprising:
- a housing securable to the bolt for a seat belt assembly;
- an apertured anchor plate slidably mounted to the housing, the anchor plate defining an opening for the bolt;
- a strain gage secured to the housing;
- a spring set between the anchor plate and the strain gage such that the strain gage is responsive to a force applied by the seat belt assembly to the anchor plate.

13. The seat belt tension sensing device according to claim 12 further comprising an actuator support set between the spring and the strain gage to actuate the strain gage.

14. The seat belt tension sensing device according to claim 12 wherein the housing includes a guide channel for receiving the spring.

15. The seat belt tension sensing device according to claim 12 wherein the anchor plate further defines a slot for securing a seat belt webbing.

16. The seat belt tension sensing device according to claim 12 further comprising a second spring set between the strain gage and the anchor plate, and an actuator slidably secured between the strain gage and both springs to actuate the strain gage.

17. The seat belt tension sensing device according to claim 12 including a stop to limit the sliding motion of the anchor plate such that the anchor plate is movable from positions in which increasing force of seat belt tension is detectable by the strain gage and a limit position in which increasing force of seat belt tension is countered by the stop.

18. The seat belt tension sensing device according to claim 17 wherein the stop is provided by a flange extending from the housing and received in the opening for the anchoring bolt.

19. The seat belt tension sensing device according to claim 17 wherein the opening in the anchor plate for the anchoring bolt is sized to provide limited sliding motion of the anchor plate with respect to the housing.

20. The seat belt tension sensing device according to claim 12 wherein the housing includes an extension transverse to the plane of the anchor plate and wherein a portion of the anchor plate abuts the projection when the seat belt tension exceeds a predetermined value.

21. The seat belt tension sensing device according to claim 12 wherein a projection is provided in an aperture of the anchor plate in the plane of the anchor plate for connection to the spring.

22. A seat belt tension sensing device suitable for use with a mounting bolt, the device comprising:
- a housing securable to the bolt for a seat belt assembly;
- an apertured anchor plate slidably mounted to the housing, the anchor plate defining an opening for the bolt and a cutout having a pair of opposing portions;
- a spring set between the pair of opposing portions;
- a strain gage secured to the housing and positioned between one of the opposing portions and the spring such that the strain gage is responsive to a force applied by the seat belt assembly to the anchor plate.

23. The seat belt tension sensing device according to claim 22 wherein the opposing portions are opposing sides of an opening defined by the anchor plate.

24. The seat belt tension sensing device according to claim 23 wherein at least one of the opposing portions includes a projection into the opening in the plane of the anchor plate for connection to the spring.

25. The seat belt tension sensing device according to claim 22 further comprising an actuator support set between the spring and the strain gage to actuate the strain gage.

26. The seat belt tension sensing device according to claim 22 wherein the housing defines a guide channel for receiving the spring.

27. The seat belt tension sensing device according to claim 22 wherein the anchor plate further defines a slot for securing a seat belt webbing.

* * * * *